E. DETTELBACH & E. W. B. POWELL.
VEHICLE WHEEL.
APPLICATION FILED APR. 2, 1908.
939,190.
Patented Nov. 2, 1909.
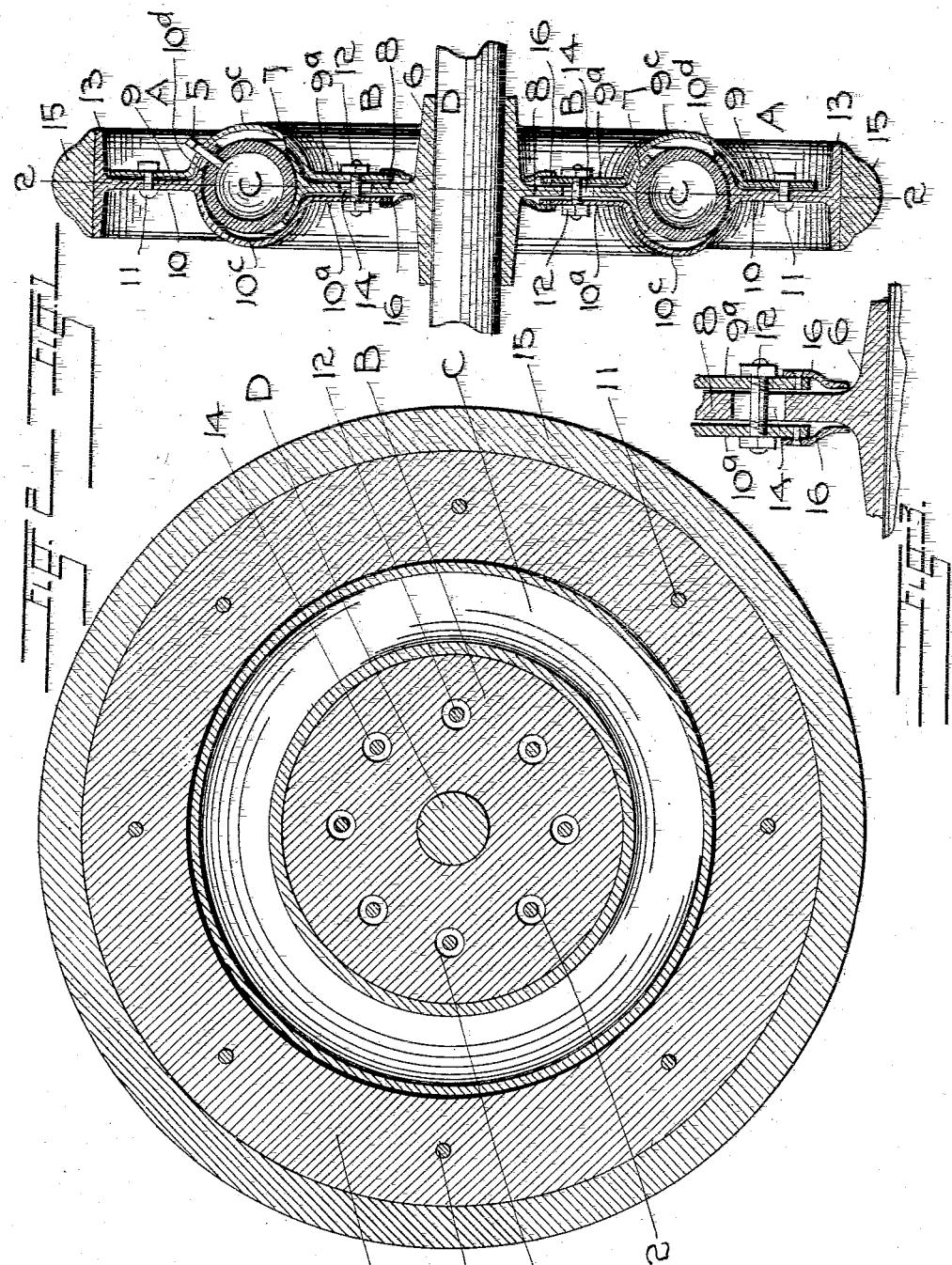
WITNESSES:
INVENTORS
E. Dettelbach
E. W. B. Powell
BY
ATTORNEY.

UNITED STATES PATENT OFFICE.

EDWARD DETTELBACH AND EDWARD W. B. POWELL, OF DENVER, COLORADO, ASSIGNORS, BY DIRECT AND MESNE ASSIGNMENTS, OF ONE-THIRD TO ALEXANDER NISBET AND ONE-THIRD TO THOMAS W. BAIRD, BOTH OF DENVER, COLORADO.

VEHICLE-WHEEL.

939,190.  Specification of Letters Patent.  Patented Nov. 2, 1909.

Application filed April 2, 1908. Serial No. 424,742.

*To all whom it may concern:*

Be it known that we, EDWARD DETTELBACH and EDWARD W. B. POWELL, citizens of the United States of America, residing at Denver, in the county of Denver and State of Colorado, have invented certain new and useful Improvements in Vehicle-Wheels, of which the following is a specification.

This invention relates to improvements in vehicle wheels and its object is to provide a device of the class named which, although equipped with a solid or non-inflatable tire, possesses all the advantageous qualities peculiar to a wheel whose tread is formed by a tubular, normally inflated or so called pneumatic tire.

We attain this object by the mechanism illustrated in the accompanying drawings in the various views of which like parts are similarly designated and in which—

Figure 1—represents a vertical, central section through the wheel and the shaft upon which it is mounted, Fig. 2—a vertical section taken along a line 2—2, Fig. 1 and Fig. 3—an enlarged fragmentary sectional view of the hub and adjacent parts of the device.

Our improved wheel consists of two normally concentric elements A and B, the outer one of which is movable in relation to the inner one, and an interposed continuous tubular element C, which being composed of india rubber, or other elastic material, is adapted to be inflated by the introduction of air through a valve-controlled inlet 5. The inner element B which, in practice, engages the shaft or axle D upon which the wheel is mounted, comprises a hub 6 and a therewith concentric concave rim 7 which are united by a centrally interposed web 8. The outer element A is composed of two annular members 9 and 10 which are separably connected by means of bolts 11 and whose inner portions $9^a$ and $10^a$ respectively engage the outer surfaces of the web 8 of the inner element B. The portions $9^a$ and $10^a$ of the members 9 and 10 are united by means of a series of equidistant bolts 12 arranged in concentric relation to the said members and whose central portions project through circular, proportionately larger openings 14 in the interposed web 8. The member 10 of the element A is provided with a surrounding flange 13, which extending laterally in opposite directions from its peripheral edge, constitutes the wheel band, upon whose circumferential surface is secured the tread or tire 15 which, in practice, bears upon the surface over which the vehicle of which the wheel forms part, is propelled. The two members 9 and 10 are furthermore formed in their inner faces with oppositely located annular, concave depressions $9^c$ and $10^c$ which enveloping the circumferential rim 7 of the inner member B form together a casing for the tubular, circular element C, which when the various elements are assembled, is seated in the concave surface of the rim. The outer peripheral surface of the tube C is engaged by the encircling portion of the member 10 which to this end is formed with a laterally extending flange $10^d$ whose inner arcual surface forms a continuation of that of the depressions $10^c$. The before mentioned valve-controlled inlet tube 5, through instrumentality of which the element C is inflated, projects through registering apertures in the flange $10^d$ and the surrounding portion of the depression $9^c$ of the member 9. The tire 15 which, as stated hereinbefore, is supported upon the wheel band 14, may be of any desired form and composed of any suitable material, india rubber being preferable on account of its elasticity.

Secured upon the inner edges of the circular members 9 and 10 of the element A are two flexible rings 16, whose inner edges engage the opposite faces of the web 8 in proximity to its juncture with the hub 6, for the purpose of excluding dust and dirt from the casing formed by the concave depressions $9^c$ and $10^c$ of the members 9 and 10, the outermost portions of which are spaced from the circumferential surface of the tubular element C to allow it to expand laterally, when the lowermost portions of the elements A and B are brought together, by pressure exerted upon the axle D.

The operation of the wheel, which has been referred to at intervals in the course of the foregoing description, will readily be understood.

When, on account of the weight supported upon the axles of the vehicle of which the wheels form part, the former are depressed or if by reason of an uneven surface over which it is propelled, the vehicle is subjected to jars and vibrations, the inflated continuous tube C will, by engagement with the rim of the inner element B and the surrounding radially movable element A, provide the amount of elasticity required to absorb the vibrations and jars to which the vehicle is subject and to thus render the motion of the vehicle body supported upon the axles equable and easy. If the tire which bears upon the road bed is composed of rubber, its elasticity augments the beneficial results derived by action of the inflated tube, while all danger of incapacitating the vehicle by puncturing of the wheel tires is eliminated.

Having thus described our invention what we claim is:—

1. In a vehicle wheel, a central member having a hub adapted to engage upon an axle and provided with a centrally disposed web 8 having apertures 14 and a concave rim 7 and an inflatable elastic tube C engaged about said rim, in combination with a two-part annular element A one part having a rim 13, a web 10, a concave inner rim portion 10$^c$ adapted to engage over tube C and an inner web 10$^a$, the other part having a concavo-convex central portion 9$^c$ and inner and outer portions 9$^a$ and 9 respectively, transverse bolts connecting the parts of element A, and the said webs 9$^a$ and 10$^a$ connected by bolts 12 through said apertures 14.

2. In a vehicle wheel, a central member having a hub and a centrally disposed web with a series of radial apertures and a rim about said web, and an inflatable tube seated upon the said rim, in combination with a two-part annular element having concavo-convex side portions which inclose the said tube and flat inner and outer webs respectively as to said concavo-convex portions, transverse bolts connecting the said inner webs through the said radial apertures and rings engaging the innermost portions of the sides of said annular element and the said centrally disposed web and providing a dust proof covering about the hub of the wheel.

3. In a vehicle wheel, a hub provided with a radially disposed web having transverse apertures therein and a concave rim located at its periphery, an inflatable elastic tube mounted upon said rim, in combination with a two part annular element, each part having a concave central portion adapted to engage over the said inflatable tube, and inner and outer web portions, bolts connecting the said outer web portions and transverse bolts connecting the said inner web portions and passing through the said apertures in the web upon the hub, said apertures being of greater diameter than the bolts passing through them.

In testimony whereof we have affixed our signatures in presence of two witnesses.

EDWARD DETTELBACH.
EDWARD W. B. POWELL.

Witnesses:
G. J. ROLLANDET,
K. M. STUMP.